United States Patent [19]

Andersson et al.

[11] Patent Number: 5,273,067
[45] Date of Patent: Dec. 28, 1993

[54] LIQUID DOSING APPARATUS

[76] Inventors: Alf Andersson, Centralgatan 9, S-260 35 Ödakra; Sören Andersson, Rimbogatan 8 B, S-761 51 Norrtälje; Ingemar Burell, Rimbogatan 10 A, S-761 51 Norrtälje, all of Sweden

[21] Appl. No.: 773,967
[22] PCT Filed: Jun. 8, 1990
[86] PCT No.: PCT/SE90/00401
 § 371 Date: Nov. 12, 1991
 § 102(e) Date: Nov. 12, 1991
[87] PCT Pub. No.: WO90/15311
 PCT Pub. Date: Dec. 13, 1990

[30] Foreign Application Priority Data

Jun. 9, 1989 [SE] Sweden ................. 8902077

[51] Int. Cl.$^5$ ............................. F04F 10/00
[52] U.S. Cl. ...................... 137/129; 137/135
[58] Field of Search ................... 137/129, 135

[56] References Cited

U.S. PATENT DOCUMENTS 1,129,898 3/1915 Patton ............... 137/135 X
2,468,692 4/1949 Stevens ............. 137/135 X

FOREIGN PATENT DOCUMENTS 121358 12/1900 Fed. Rep. of Germany .

Primary Examiner—Gerald A. Michalsky
Attorney, Agent, or Firm—Kane, Dalsimer, Sullivan, Kurucz, Levy, Eisele and Richard

[57] ABSTRACT

A liquid dosing apparatus comprises a tank (8) to be repeatedly filled with liquid to an upper level; a float (24) adapted to rise in the tank concurrently with the filling thereof and, each time the upper level has been reached, to be wholly or partly filled with liquid so as to sink in the tank, thus actuating a draining siphon (15) which drains the tank to a lower level; and a float siphon (27) draining the float (24) so that this will float again when the liquid level rises after the tank has been drained. The actuating of the draining siphon (15) by the float (24) is achieved by the provision of a chamber (13) which communicates with the tank (8) so as to be filled with liquid when the tank (8) is being filled, an inlet (20) of the draining siphon (15) being connected to the chamber (13). The sinking movement of the float (24) reduces the amount of liquid in the chamber (13), the liquid being pressed into the inlet (20) of the draining siphon for actuating the latter. An outlet leg (30) of the float siphon (27) opens into the chamber (13), and a higher static pressure in the chamber (13) thus efficiently contributes to actuating the float siphon (27).

8 Claims, 5 Drawing Sheets

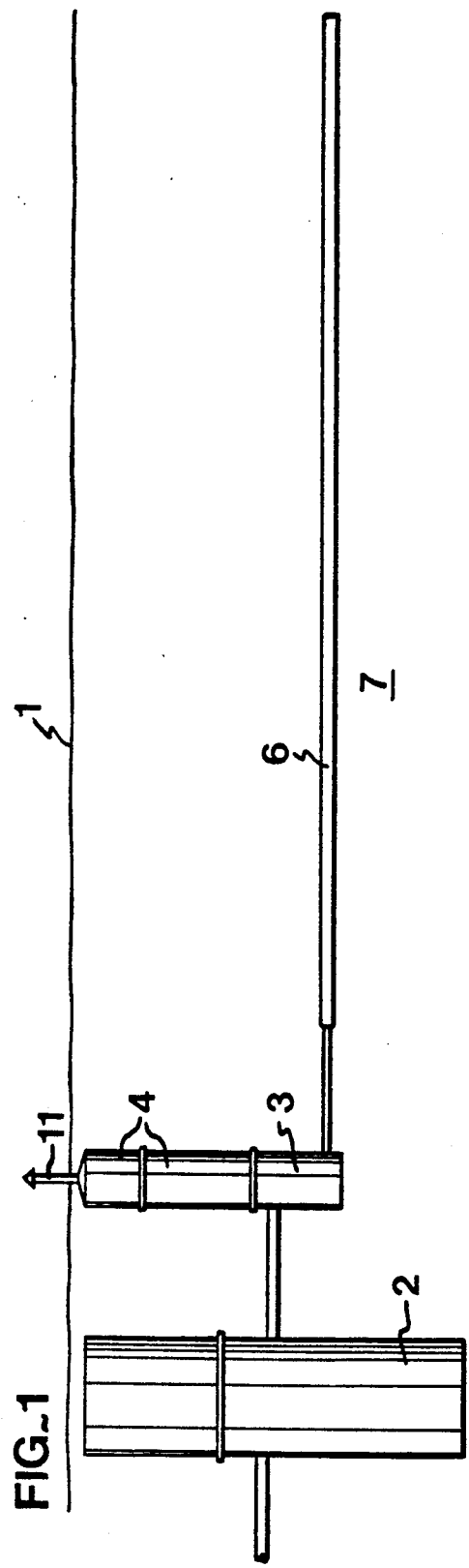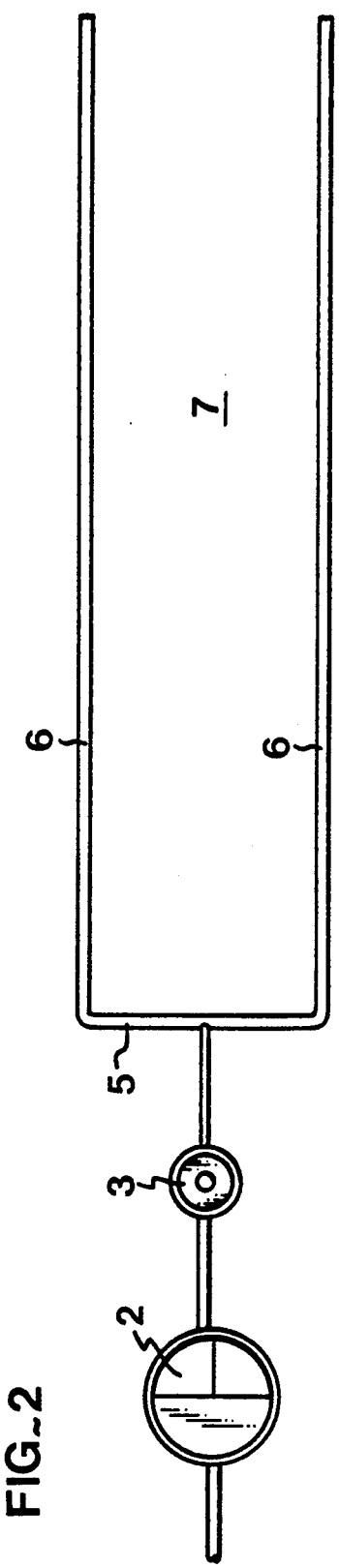

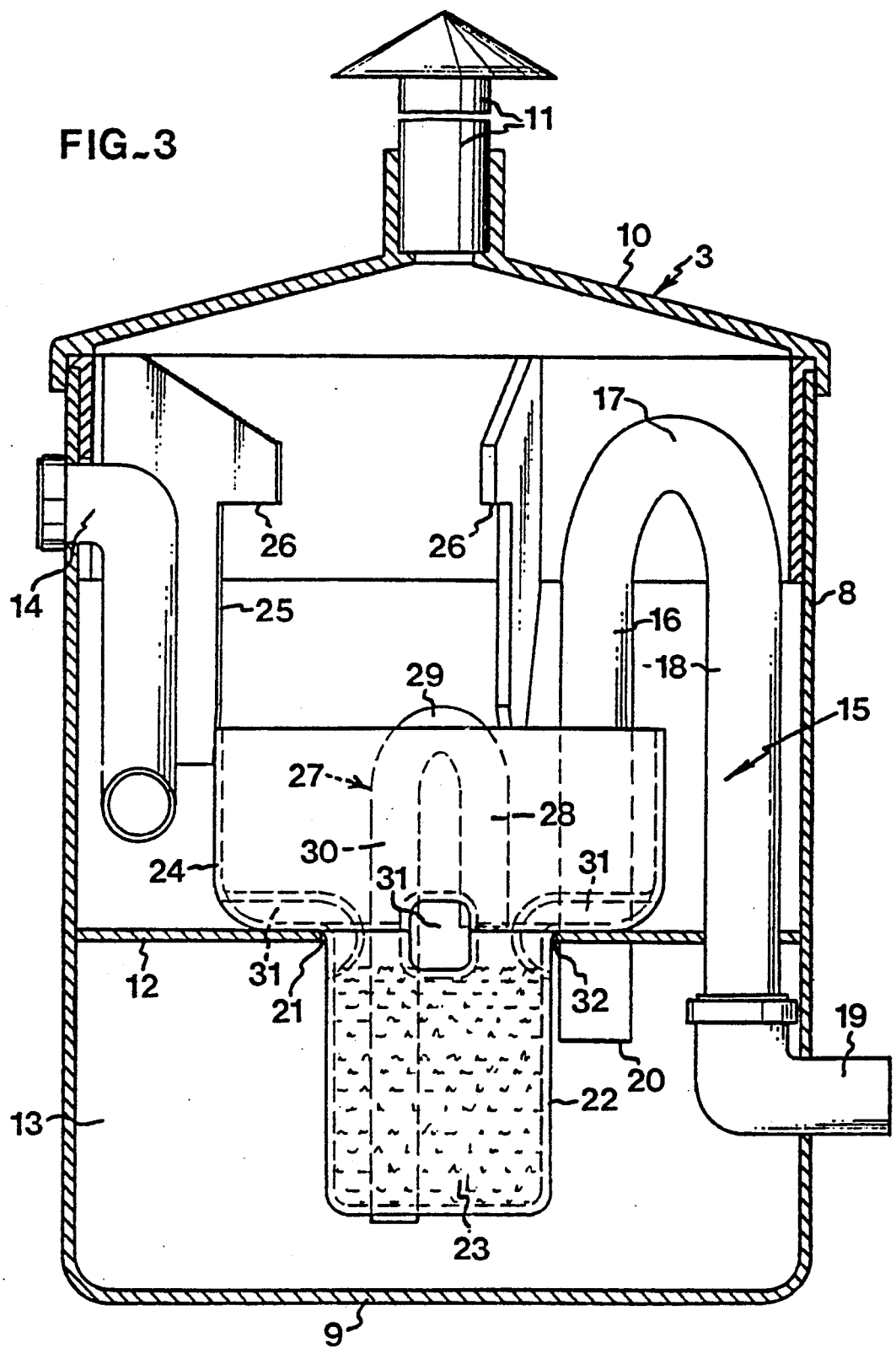
FIG._3

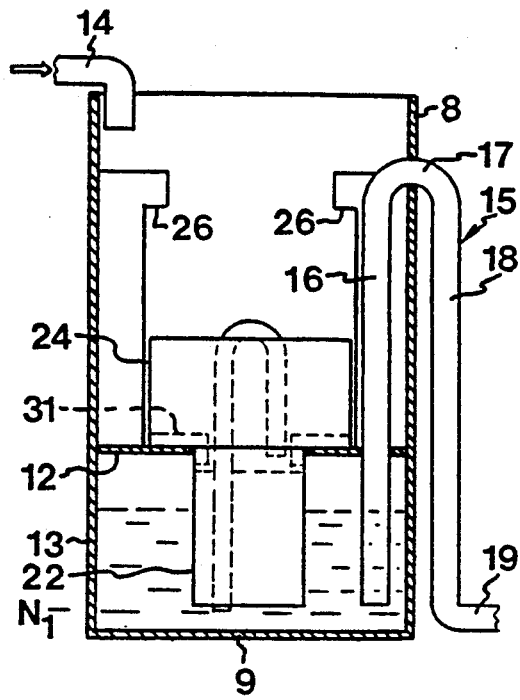
FIG._4A
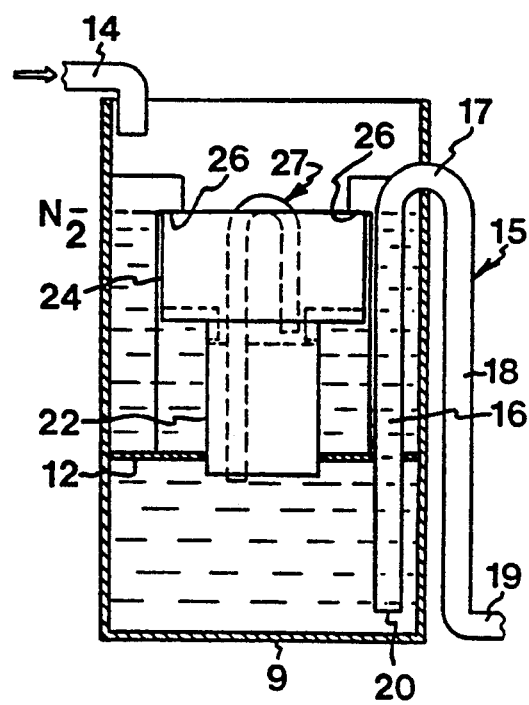
FIG._4B
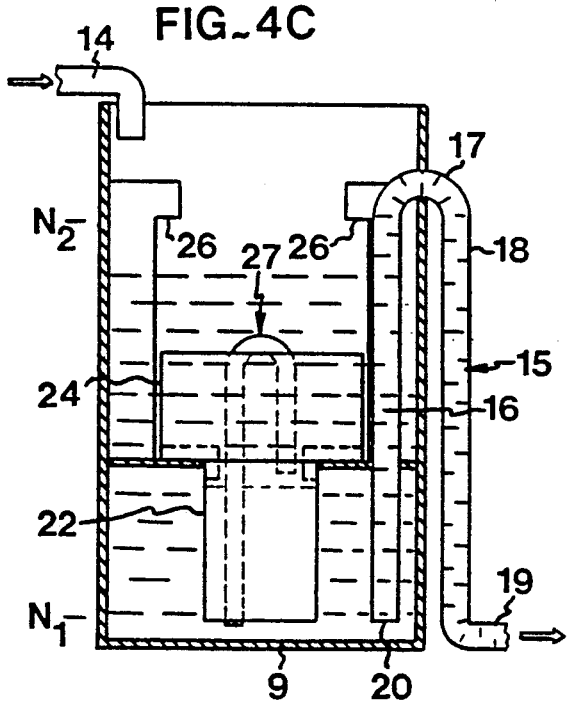
FIG._4C
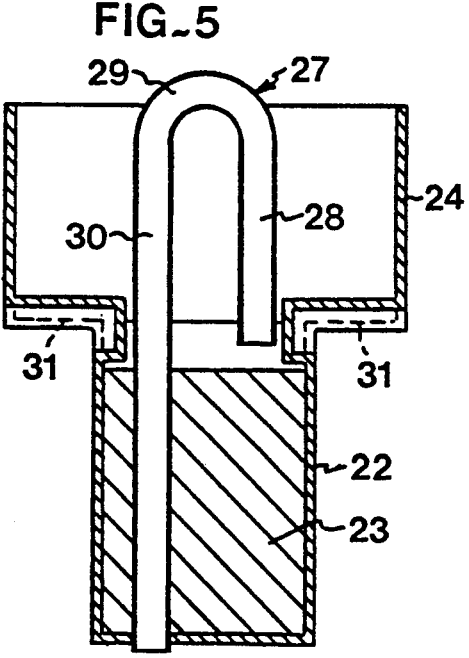
FIG._5

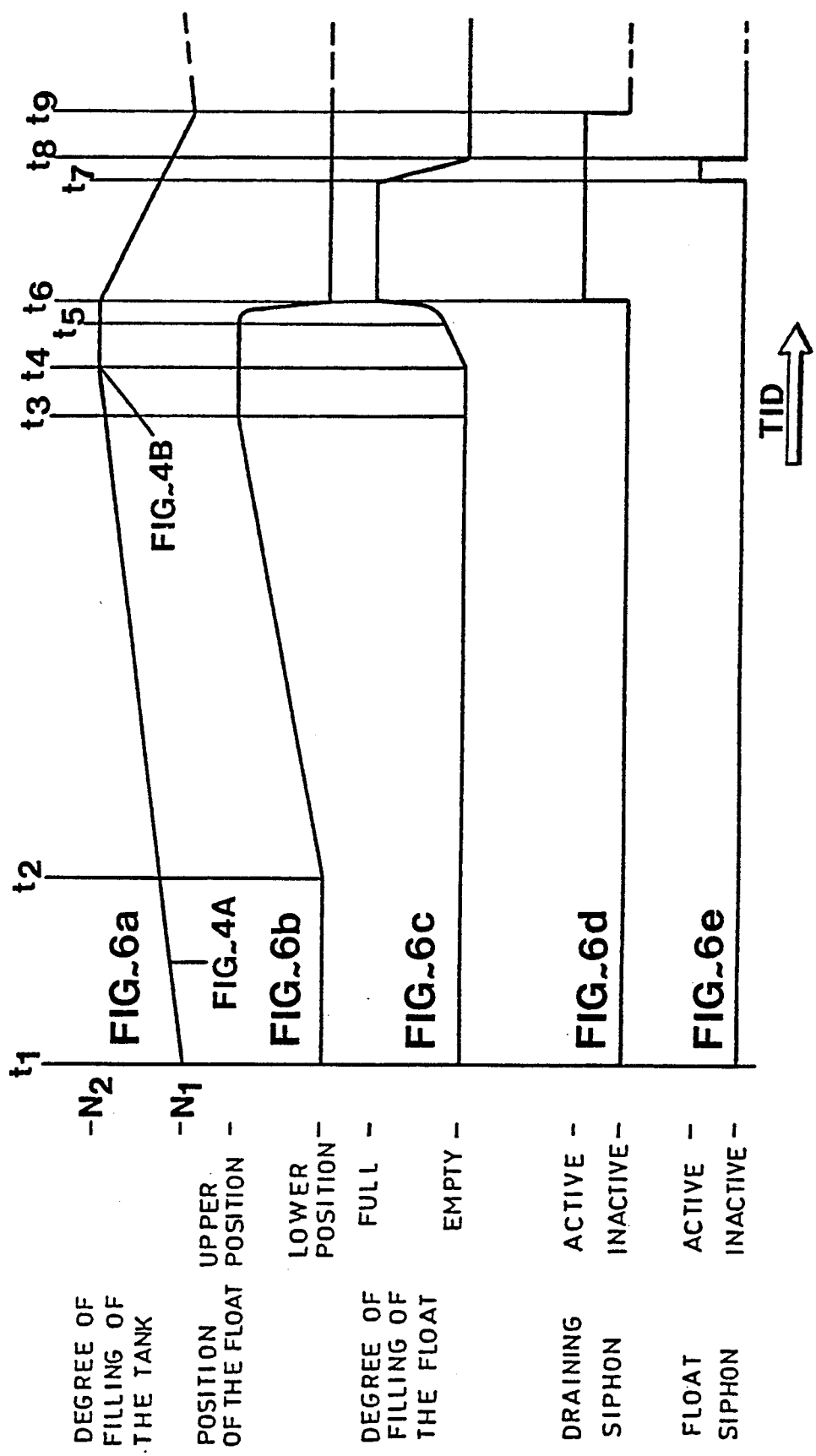

FIG_7
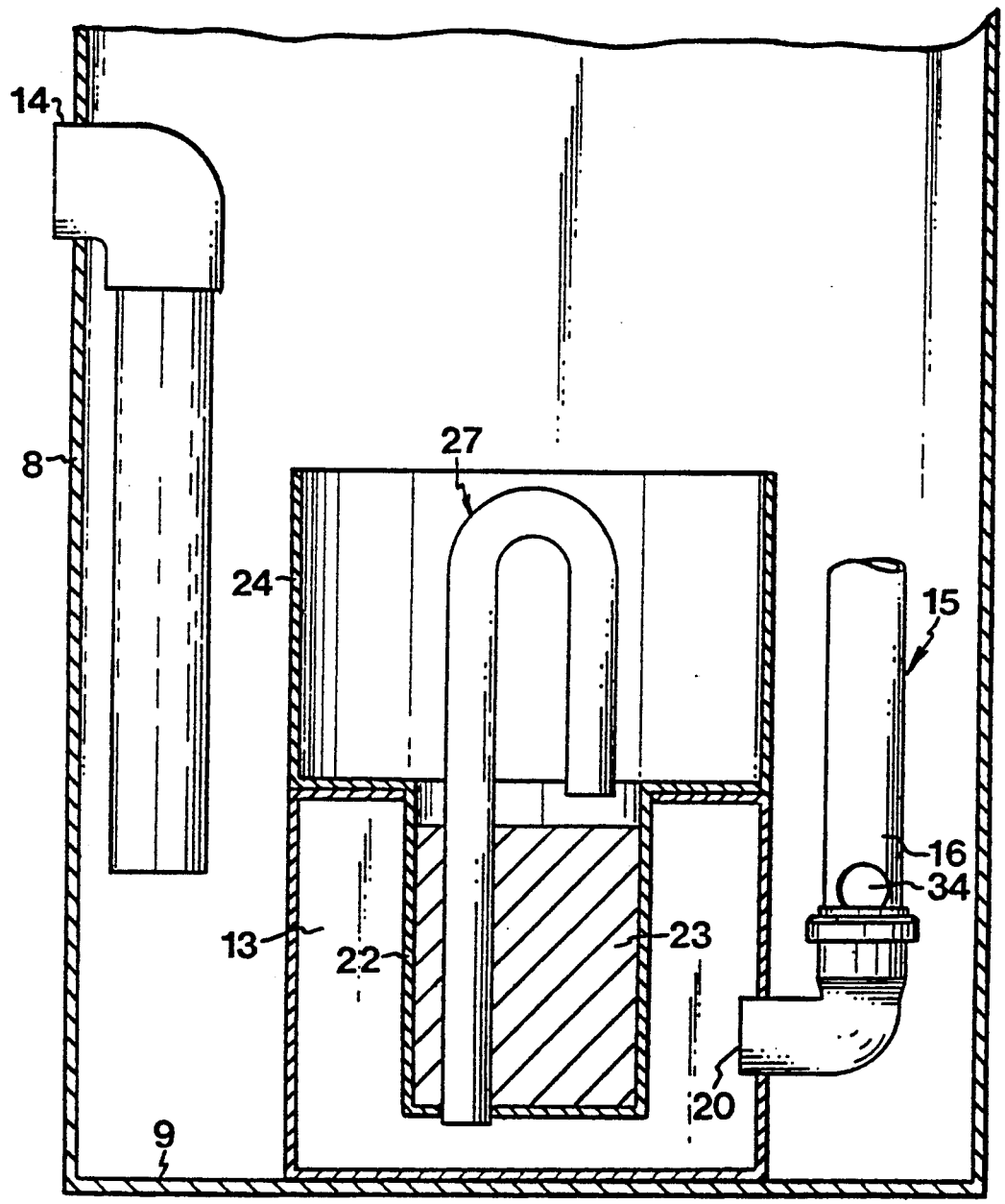

LIQUID DOSING APPARATUS

The present invention relates to a liquid dosing apparatus adapted to repeatedly collect liquid in a tank and, each time the liquid therein has risen to a predetermined upper level, to automatically drain the tank to a predetermined lower level. More precisely, the invention concerns a liquid dosing apparatus of the type defined in the preamble to claim 1 and disclosed in U.S. Pat. No. 2,468,692.

When soil is infiltrated with waste water, a bacterial flora is formed which decomposes the impurities in the water. Naturally enough, the decomposition capacity of such a bacteria-permeated soil layer, a so-called bioskin, is limited, for which reason the waste water must be distributed over a sufficiently large area to avoid considerable environmetal and health hazards. According to current instructions for manufacturing and dimensioning of infiltration plants, the water should be distributed by means of distributing pipes having a given minimum length. Furthermore, the underside of the pipes should be formed with uniformly distributed outlet holes of a given size. Also, the pipes should be placed in a bed of sand or gravel.

Since the holes must be large enough not to be clogged by the impurities in the water, a feeble flow of water will find its way out through the lowest holes or the holes closest to the inlet of the pipe. In such conditions, the waste water will thus be distributed over an area much smaller than the one intended, whereby the impurities will pass unaffected through the bioskin. Moreover, the risk is considerable that the water will find its way directly down to the ground water, and it is, of course, of the outmost importance that such risks be eliminated as far as possible.

One way to distribute the waste water over the entire intended surface is to let it flow out intermittently. In that case, the flow momentarily becomes strong enough to fill the distribution pipes with water, and essentially the same amount of water then flows out through each of the outlet holes. This may, for instance, be achieved in that a pump is made to drain a receptacle, or in that the receptacle is provided with a valve which is opened to let out the water when this has risen to a certain level. However, a pump requires electric installations with wires laid in the ground, and a pump device cannot be expected to give reliable service for several decades, as required. Nor is it easy to provide a valve system which does not leak and which also in other respects stays reliable during that time.

One object of the present invention is therefore to provide a liquid dosing apparatus for the above-mentioned purpose, which has few moving parts, is extremely reliable, does not require any electric equipment or electric connections, and has a mode operation which does not depend on the unfailingly intact sealing function of a periodically working valve means.

DE 121,358 discloses a liquid dosing apparatus fulfilling some of these requirements. The siphoning apparatus described therein comprises a tank to be repeatedly filled with liquid to an upper level; a float adapted to rise in the tank concurrently with the filling thereof and, each time the upper level has been reached, to be wholly or partly filled with liquid so as to sink in the tank to actuate a draining siphon adapted to drain the tank to a lower level; and a float siphon associated with the float and adapted to drain the float so that this will float again when the liquid level rises after the tank has been drained. In this known apparatus, the vertically movable float is fixedly connected with a valve member arranged in the draining siphon. When the tank is being filled, the valve member sealingly rests against a valve seat so as to prevent any water from flowing out through the siphon. At the end of the filling operation, the float is applied against an upper abutment so that the continuing filling of the tank causes water to flow over into the float which is thus filled. The ensuing sinking of the float causes the valve member to move down and away from the valve seat, thus opening and actuating the draining siphon which begins draining the tank.

Admittedly, this apparatus, which for one thing does not serve the same purpose as the present invention, has few moving parts and no electric components. All the same, it has the serious disadvantage that it requires the use of a valve member and a valve seat. These parts are not likely to operate satisfactorily for periods of up to half a century. It may also be pointed out that it would be extremely difficult to exchange such parts since a dosing apparatus is often buried at a considerable depth.

U.S. Pat. No. 1,129,898 discloses another siphoning apparatus which, like the present invention, operates without any valve member which has to be sealingly applied against a valve seat. This apparatus is based on the principle that the float, when sinking in the tank, lowers the upper "turning point" of the draining siphon to below a liquid level reached in the inlet leg of the draining siphon. It, however, requires the use of a special water seal, which no doubt jeopardises the reliability of the apparatus if used for a longer period of time.

U.S. Pat. No. 2,468,692 discloses a rain-gauge with automatic drainage, said rain-gauge being equipped with a liquid dosing apparatus comprising a tank to be repeatedly filled with liquid to an upper level; a float adapted to rise in the tank concurrently with the filling thereof and, each time the upper level has been reached, to be wholly or partly filled with liquid so as to sink in the tank; a draining siphon actuated by the sinking float to drain the tank to a lower level; a float siphon accompanying the float and draining said float so that this will float again when the liquid level rises after the tank has been drained; a chamber which communicates with the tank so as to be filled with liquid when said tank is being filled, an inlet of the draining siphon being connected to said chamber; and a liquid expelling body accompanying the float and adapted to be successively introduced into the chamber when said float is sinking, so as to press liquid into the inlet of the draining siphon, thus actuating the latter.

In plants for the infiltration of waste water in the ground, it is desirable that the difference between the highest and the lowest water level in the dosing apparatus is as small as possible, since this difference is related to the depth at which the distribution pipes starting from the draining apparatus have to be located. If one wishes to achieve an acceptable difference between the highest and the lowest water level in the draining apparatus, it is not possible to use the apparatus in U.S. Pat. No. 2,468,692 since the drop of the float would not be sufficient to actuate the float siphon.

The present invention provides a liquid dosing apparatus of the type disclosed in U.S. Pat. No. 2,468,692, which is further characterised in that the float siphon has an outlet leg extending through the liquid expelling body and opening into the chamber.

The apparatus according to the invention allows a considerable reduction of the difference between the highest and the lowest level of water while maintaining a perfectly satisfactory function of the float siphon. This is achieved because the outlet leg of the float siphon opens into the chamber. When the float sinks and the liquid expelling body is successively introduced into the chamber, a higher static pressure arises in the chamber compared to the pressure in the remainder of the tank. This static pressure efficiently contributes to expelling the air in the float siphon so that the latter can be actuated even if the drop of the float is slight.

When the apparatus according to the present invention is used together with an infiltration plant of the type mentioned in the introduction to this specification, the water flow is thus distributed to all the outlet holes in the distribution pipes owing to the waste water collecting in the tank and flowing out at high speed for a short period of time. This is achieved by the float arranged in the tank actuating the draining siphon when a predetermined upper level of liquid has been reached in the tank, and by the draining siphon being rendered inactive when a predetermined lower liquid level has been reached in the tank.

In a preferred embodiment of the invention, the liquid is expelled by means of a liquid displacement body which, when the float is sinking, takes up a gradually increasing part of the chamber, thus reducing the amount of liquid in said chamber.

Optionally, the chamber is formed in the lower part of the tank by providing in said tank a partition with an opening allowing the passage of the liquid displacement body.

It is also conceivable to arrange the chamber inside a separate unit which can be placed on the bottom of an existing tank to be converted into a liquid dosing apparatus according to the invention.

When using a partition of the above type, valve means may be provided for achieving said communication between the chamber and the tank, said valve means permitting liquid to flow to the chamber from the tank when this is being filled, as well as restricting the flow in the opposite direction when the amount of liquid in the chamber is being reduced.

An especially reliable embodiment of these valve means comprises one or more recesses formed in the liquid displacement body and so located therein that they, when said body is maximally introduced into the chamber, are on a level with said opening in the partition to form said liquid communication between the tank and the chamber. These recesses are thus inactive (i.e. the valve means are closed) when the liquid displacement body is successively introduced into the chamber for expelling water therefrom into the draining siphon. The recesses do not open the communication until the displacement body is substantially completely contained in the chamber, so that, when the tank is being filled again after it has been completely drained, water can flow from the upper side of the partition, through the opening for the displacement body via the recesses, and down into the chamber.

To prevent the displacement body from getting stuck in said opening, there may advantageously be a certain limited play between the displacement body and the peripheral edge of said opening when the valve means are closed.

Other advantages and embodiments of the invention will be apparent from the following detailed description of the invention, reference being had to the accompanying drawings in which FIGS. 1 and 2 are a sectional side view and a top view, respectively, illustrating the use of a liquid dosing apparatus according to the invention in an infiltration plant, FIG. 3 is a section showing the interior of a first embodiment of the liquid dosing apparatus according to the invention, FIGS. 4A–4C show the embodiment in FIG. 3 and illustrate the mode of operation thereof, FIG. 5 is a section of a float forming part of the embodiment in FIG. 3, FIG. 6 show time diagrams a-e schematically illustrating the mode of operation of the embodiment in FIG. 3, and FIG. 7 illustrates a second embodiment of the liquid dosing apparatus according to the invention.

The infiltration plant shown in FIGS. 1 and 2 is located under the ground surface 1 and comprises a so-called three-compartment septic tank 2, a dosing apparatus 3, add-on pipes 4 (allowing the inspection of the dosing apparatus 2 also if this is located at a considerably depth in the ground), and a branch pipe 5 connected to two distributing pipes 6 whose undersides in known manner are formed with a number of uniformly distributed outlet holes (not shown). As is shown schematically in FIG. 1, the distributing pipes 6 are placed in a bed 7 of sand or gravel.

The dosing apparatus 3, of which a first preferred embodiment will now be described with reference to FIG. 3, comprises a tank 8 which has a bottom 9 and a lid 10 with a venting device 11. The tank 8 is partitioned by means of a horizontal partition 12 to form a chamber 13 in the lower part of said tank 8.

The tank 8 has an inlet pipe 14 opening into the tank 8 above the partition 12. Furthermore, a draining siphon 15 having an inlet leg 16, a U-shaped pipe bend 17, and an outlet leg 18 connected to an outlet pipe 19 is also arranged in the tank. As is apparent from FIG. 3, the inlet 20 of the draining siphon 15 is arranged in the chamber 13.

The partition 12 of the tank 8 has a central opening 21 allowing a liquid displacement body 22 to be introduced into the chamber 3 to varying degrees. The displacement body 22 is essentially completely filled with a material 23, e.g. concrete, of a higher density than the liquid with which the tank 8 is to be filled. Moreover, the displacement body 22 is, at its upper end, integrally connected with an upwardly open bowl-shaped member 24. Together, the bowl-shaped member 24 and the displacement body 22 form a float which is vertically movable in the tank 8 and whose buoyancy can be varied by filling or draining the bowl-shaped member 24.

The movement of the float is laterally guided by a number of guide members 25 and by the peripheral edge of the opening 21, and upper stop lugs 26 restrict the upwardly directed movement of the float in such a manner that there is at all times a guiding action between the displacement body 22 and the peripheral edge of the opening 21.

A float siphon 27 is arranged in the float. The float siphon 27, which is drawn with broken lines, has an inlet leg 28 opening into the bowl-shaped member 24, a U-shaped pipe bend 29, and an outlet leg 30 extending down through the displacement body 22 and opening, below said body, into the chamber 13.

As shown by broken lines in FIG. 3 and in FIG. 5, which only shows the float, there are provided in the transition area between the two members of the float, i.e. the bowl-shaped member 24 and the displacement body 22, four channels 31 which are circumferentially uniformly distributed and which connect the chamber 13 to the upper part of the tank when the displacement body 22 is maximally introduced into the chamber 13, and the bottom of the bowl-shaped member 24 rests on the upper side of the partition 12, as is the case in FIG. 3.

Moreover, the cross-section of the displacement body 22 is slightly smaller than that of the opening 21, resulting in a gap or play 32 between the displacement body 22 and the peripheral edge of the opening 21 when the displacement body 22 is in a higher position than the one shown in FIG. 3. Thus, the float is prevented from getting stuck in the opening 21.

The mode of operation of the dosing apparatus shown in FIG. 3 will now be illustrated with reference to FIGS. 4A-4C which illustrate different steps of the mode of operation of the apparatus, and to the time diagrams a-e in FIG. 6 which in turn schematically illustrate the degree of filling of the tank 8, the vertical position of the float, the degree of filling of the float, the function of the draining siphon 15, and the function of the float siphon 27.

At a time $t_1$, the liquid in the tank 8 is at a predetermined lower level $N_1$, the float is in its lower position (the bottom of the bowl-shaped member 24 rests on the upper side of the partition 12), the float is empty, and both siphons 15 and 27 are inactive.

Suppose now that liquid is supplied through the inlet pipe 14 of the tank 8 after the time $t_1$.

The liquid supplied to the upper part of the tank will then, via the channels 31, flow down into and fill the chamber 13, as illustrated in FIG. 4A. The degree of filling shown in FIG. 4A is insufficient to lift the float from its lower position of rest.

When the liquid level subsequently rises above the partition 12 in the upper part of the tank 8, the float, which is not filled with liquid, will start rising in the tank at a time $t_2$.

As soon as the float rises from the partition 12, the communication through the channels 31 is interrupted and liquid can only flow through the gap 32.

Before the liquid in the tank 8 has reached its upper level $N_2$ (which it does at a time $t_4$), the float will, at a time $t_3$, be caused to apply against the upper stop lugs 26, thus preventing the float from rising further in the tank, as illustrated in diagram 6b.

After the time $t_3$, the liquid level continues to rise in the tank 8 and, at a time $t_4$, it reaches the upper edge of the bowl-shaped member 24. This position is shown in FIG. 4B. It should be observed that the U-shaped pipe bend 17 of the draining siphon is not filled with liquid in this position.

When liquid continues to flow into the tank 8 through the inlet 14, it will, instead of rising further in the tank 8, start to overflow the upper edge of the bowl-shaped member 24 and flow down into and fill the float. Initially, the float will continue to float and be applied against the stop lugs 26, the rate at which the liquid rises in the float depending entirely on the size of the inflow through the inlet 14. This initial filling of the float is illustrated in diagram 6c between the times $t_4$ and $t_5$. During this time interval, the liquid level in the tank 8 is thus identical with the predetermined upper level $N_2$, and the float is firmly applied against the stop lugs 26.

Thus far, both the draining siphon 15 and the float siphon 27 have been inactive and done no siphoning. This is illustrated in diagrams 6d and 6e, respectively.

At a time $t_5$, the liquid level in the bowl-shaped member 24 of the float has risen so much that the float is no longer floating. The float starts to sink, first slowly as is shown in diagram 6b, then faster as is illustrated in diagram 6c, owing to the increasing filling of the bowl-shaped member 24 caused by the sinking movement.

Owing to this sinking movement, the liquid displacement body 22 will be introduced into the chamber 13, which is filled with liquid, to expel a corresponding amount of liquid therefrom. The liquid expelled from the chamber 13 can escape by three paths, namely through the inlet 20 of the draining siphon 15, through the gap 32, and through the float siphon 27. The amount of liquid taking each path depends on the area of that path. What is functionally important is that the draining siphon 15 is at least filled above its upper U-shaped pipe bend 17 so that siphoning, and consequently the draining of the tank 8 through the outlet pipe 19, begins. This is illustrated in diagrams 6a and 6d after the time $t_6$.

The tank 8 will then be drained to a predetermined lower level $N_1$ at which the draining siphon is automatically rendered inactive in known manner. This draining action is illustrated in FIG. 4A.

To make the apparatus work automatically and repeatedly, the float then has to be drained prior to the next filling. The draining is carried out automatically by means of the float siphon 27. It may be observed that the float siphon 27 is completely filled with liquid approximately at the same time as the draining siphon 15, i.e. when the float sinks in the tank during the interval $t_5$-$t_6$. Thus, the float siphon 27 is made ready to start siphoning as soon as the level of liquid in the tank 8 has sunk below the upper edge of the bowl-shaped member 24. This occurs at a time $t_7$ in FIG. 6 in which the diagram e illustrates that the float siphon 27 is active during the time interval $t_7$-$t_8$.

In the embodiment shown, the draining of the tank 8 by means of the draining siphon 15 continues also after the draining of the float has ended at $t_8$. At a time $t_9$, the tank 8 has been drained to its lower level $N_1$ and the situation is the same as at the time $t_1$, and the whole procedure can thus be repeated.

As to the time diagrams in FIG. 6, it should be observed that the relative distance between the times $t_1$, $t_2$, ..., $t_9$ and the appearance/inclination of the curves may in actual practice differ from FIG. 6, which merely serves to schematically illustrate the basic mode of operation of an embodiment of the invention.

FIG. 7 illustrates a second embodiment of the liquid dosing apparatus according to the invention, which in principle functions in the same way as the embodiment in FIG. 3. However, the embodiment in FIG. 7 is based on an existing tank 8 with an inlet 14, a unit comprising the chamber 13, the bowl-shaped member 24 of the float, the displacement body 22, the float siphon 27, and the draining siphon 15 being arranged on the bottom 9 of the tank 8. Furthermore, the embodiment of FIG. 7 lacks the channels 31 and the liquid communication is instead achieved by means of one or more openings 34 in the lower portion of the inlet leg 16 of the draining siphon 15.

We claim:

1. A liquid dosing apparatus, comprising:

a tank adapted to be repeatedly filled with a liquid to an upper level;

a float adapted to rise in the tank concurrently with said filling of the tank and, each time said upper level has been reached, to be wholly or partly filled with said liquid so as to sink in the tank;

a draining siphon presenting an inlet and adapted to be actuated by said sinking float to drain the tank to a lower level;

a float siphon presenting an outlet leg and accompanying the float for draining the float so that the latter will float when the level of said liquid rises again after the tank has been drained by said draining siphon;

a chamber being in liquid communication with the tank so as to be filled with said liquid when the tank is being filled, said inlet of the draining siphon being connected to said chamber; and a liquid expelling body accompanying the float and adapted to be successively introduced into the chamber when the float is sinking, so as to press liquid into said inlet of the draining siphon for actuating the latter, wherein said outlet leg of the float siphon extends through the liquid expelling body and opens into the chamber.

2. Apparatus as claimed in claim 1, wherein the liquid expelling body is a liquid displacement body adapted to, when the float is sinking, take up a gradually increasing part of the chamber, thus reducing the amount of said liquid in the chamber.

3. Apparatus as claimed in claim 2, wherein said tank is provided with a partition for defining said chamber in a lower part of the tank, said partition having an opening allowing the passage of the liquid displacement body.

4. Apparatus as claimed in claim 3, further comprising valve means provided adjacent to said partition for establishing said liquid communication between the chamber and the tank, said valve means permitting said liquid to flow into the chamber from tank when the latter is being filled, as well as restricting a flow of said liquid in the opposite direction when the amount of liquid in the chamber is being reduced.

5. Apparatus as claimed in claim 4, wherein said valve means comprise at least one recess which is formed in the liquid displacement body and is so located in the latter that it, when the liquid displacement body is maximally introduced into the chamber, is on a level with said opening in the partition to establish said liquid communication between the chamber and the tank.

6. Apparatus as claimed in claim 4, wherein, for preventing the liquid displacement body from getting stuck in said opening in the partition, there is a certain limited play present between the liquid displacement body and a peripheral edge of said opening in the partition when the valve means are closed.

7. Apparatus as claimed in claim 4, wherein said valve means comprise at least one recess, which is formed in the liquid displacement body and is so located in the latter that it, when the liquid displacement body is maximally introduced into the chamber, is on a level with said opening in the partition to establish said liquid communication between the chamber and the tank, wherein the float and the liquid expelling body in combination include an upper bowl-shaped member to be repeatedly filled by and drained of said liquid, and downwardly projecting lower member forming the liquid expelling body and being attached to a bottom of said bowl-shaped member and presenting a specific weight exceeding that of the liquid with which the tank is to be filled, and wherein said at least one recess in the liquid displacement body connects with a corresponding number of grooves in said bottom of the bowl-shaped member.

8. Apparatus as claim in claim 1, wherein the float and the liquid expelling body in combination include an upper bowl-shaped member to be repeatedly filled with and drained of said liquid, and a downwardly projecting lower member forming the liquid expelling body and being attached to a bottom of said bowl-shaped member presenting a specific gravity exceeding that of the liquid with which the tank is to be filled.

* * * * *